(12) United States Patent
Pfaff et al.

(10) Patent No.: US 10,228,006 B2
(45) Date of Patent: Mar. 12, 2019

(54) METHOD FOR PRODUCING A FASTENING ARRANGEMENT, AND SUCH FASTENING ARRANGEMENT

(71) Applicant: PROGRESS-WERK Oberkirch AG, Oberkirch (DE)

(72) Inventors: Michael Pfaff, Oberkirch (DE); Frank Domnik, Kappelrodeck (DE); Tobias Kraus, Renchen (DE); Franz Mayer, Oberkirch (DE); Romain Roucco, Holtzheim (FR); Stephan Kasper, Oberkirch (DE)

(73) Assignee: PROGRESS-WERK OBERKIRCH AG, Oberkirch (DE)

( * ) Notice: Subject to any disclaimer, the term of this patent is extended or adjusted under 35 U.S.C. 154(b) by 285 days.

(21) Appl. No.: 14/807,470

(22) Filed: Jul. 23, 2015

(65) Prior Publication Data

US 2016/0023690 A1 Jan. 28, 2016

(30) Foreign Application Priority Data

Jul. 24, 2014 (DE) ........................ 10 2014 110 483

(51) Int. Cl.
*F16B 5/00* (2006.01)
*F16B 11/00* (2006.01)
(Continued)

(52) U.S. Cl.
CPC ........ *F16B 11/002* (2013.01); *B60R 11/0235* (2013.01); *F16B 5/0233* (2013.01);
(Continued)

(58) Field of Classification Search
CPC .... F16B 11/002; F16B 5/0233; F16B 37/061; F16B 37/068; F16B 37/048; B60R 11/0235
See application file for complete search history.

(56) References Cited

U.S. PATENT DOCUMENTS

2012/0216574 A1 8/2012 Graf et al.
2012/0275845 A1* 11/2012 Etling ..................... F16B 5/065
403/53

FOREIGN PATENT DOCUMENTS

DE 10007046 8/2001
DE 102006024056 11/2007
(Continued)

*Primary Examiner* — Richard Chang
(74) *Attorney, Agent, or Firm* — Jason H. Vick; Sheridan Ross, PC

(57) ABSTRACT

A method of producing a fastening arrangement for the position-correct fastening of a component to a structural part of a motor vehicle comprises the steps: providing of the structural part; providing of a first tolerance compensation element and a second tolerance compensation element; positioning of the first tolerance compensation element, while holding the structural part firmly, relative to the structural part in a nominal position for the later position-correct fastening of the component to be fastened, and holding of the first tolerance compensation element in the nominal position, the first tolerance compensation element being positioned with a gap relative to the structural part; inserting of the second tolerance compensation element between the first tolerance compensation element and the structural part, so that the gap between the first tolerance compensation element and the structural part is bridged over; joining of the second tolerance compensation element to the first tolerance compensation element and to the structural part.

10 Claims, 5 Drawing Sheets

(51) Int. Cl.
*F16B 5/02* (2006.01)
*F16B 37/04* (2006.01)
*F16B 37/06* (2006.01)
*B60R 11/02* (2006.01)

(52) U.S. Cl.
CPC .......... *F16B 37/048* (2013.01); *F16B 37/061* (2013.01); *F16B 37/068* (2013.01)

(56) References Cited

FOREIGN PATENT DOCUMENTS

| | | |
|---|---|---|
| EP | 1094230 | 4/2001 |
| EP | 2420433 | 2/2012 |

* cited by examiner

METHOD FOR PRODUCING A FASTENING ARRANGEMENT, AND SUCH FASTENING ARRANGEMENT

CROSS-REFERENCE TO RELATED APPLICATION

The present application claims priority of German patent application No. 10 2014 110 483.8 filed on Jul. 24, 2014 the entire contents of which is incorporated herein by reference.

BACKGROUND OF THE INVENTION

The invention relates to a method for producing a fastening arrangement for the position-correct fastening of a component to a structural part of a motor vehicle.

The invention moreover relates to a fastening arrangement for the position-correct fastening of a component to a structural part of a motor vehicle.

A component being fastened to a structural part of a motor vehicle is for example an instrument, such as a head-up display, without the present invention being restricted to this. A structural part of a motor vehicle to which the component is being fastened is for example a cross beam, part of a cross beam, or a holder fastened to the cross beam, without the present invention being restricted to this. Without limiting the general nature, the method according to the invention and the fastening arrangement according to the invention shall be described by the example of the fastening of a head-up display to a cross beam, part of a cross beam, or a holder fastened to the cross beam.

The cross beam of a motor vehicle is situated between the two A-columns beneath the windscreen and serves as a stabilizing part of the motor vehicle chassis, as well as for the fastening of the steering column, the dashboard, or other components, such as a head-up display.

One problem which occurs in motor vehicle design is that structural parts like the cross beam have manufacturing tolerances after being produced, which are the result of welding processes, for example. Such manufacturing tolerances of a structural part mean that a component being fastened to the structural part cannot be fastened with sufficient precision in position-correct manner to the structural part. In the event that the component being attached is a head-up display, the position-correct fastening of the head-up display to the cross beam is essential. Since the head-up display is an optical instrument by which vehicle parameters such as the instantaneous speed of movement can be projected onto the windscreen and read off by the driver by virtue of reflection from the windscreen, the position-correct placement of the head-up display is especially important. If the orientation and positioning of the head-up display is not correct, it may happen that the vehicle parameters are not projected in the right place or at the right angle onto the windscreen, so that they do not lie in the field of vision of the driver and therefore the driver cannot read off the vehicle parameters, or the vehicle parameters are shown with distortion.

At present, manufacturing inaccuracies during the production of structural parts such as the cross beam are compensated by machining to achieve the required tolerance for the cross beam. However, this has the disadvantage of producing metal chips, and the structural part such as the cross beam is exposed to substantial stresses. Furthermore, such a finish machining of the fabricated structural parts involves additional time and expense.

In document EP 2 420 433 A1 a method and a fastening arrangement for the position-correct fastening of a component to a structural part of a motor vehicle are described, wherein a tolerance compensation element is positioned by means of an adhesive or by means of ultrasound welding relative to the structural part in correct position. The component is then fastened to the tolerance compensation element. In this procedure, manufacturing tolerances at the cross beam are compensated by adjusting the thickness of the adhesive layer or the thickness of the plastic layer produced during the ultrasound welding. Thus, no later machining of the structural part is required with this method. Even so, this known method has the drawback of being cost-intensive. A further drawback is that the method is sensitive to environmental conditions such as temperature and humidity. Moreover, it is necessary for the joints between the tolerance compensation element and the structural part being filled with adhesive or molten plastic to be clean and especially free of grease in order to ensure a secure adhesion of the tolerance compensation element to the structural part. Accordingly, the joints must be cleaned and especially degreased, which in turn involves time and expense. The process stability of this known method therefore cannot be assured without additional expense.

In document EP 1 094 230 A2 a fastening arrangement is described for the fastening of a head-up display in an airplane cockpit, wherein a first part is attached directly to a structural part of the airplane frame by screw fasteners. The first part has a box-like receptacle, in which a second shaft-like part is installed, the box-like receptacle and the shaft representing a kind of ball joint connection. After orienting the second part in the correct position, the remaining space between the shaft and the receptacle is filled with an adhesive, and after the hardening of the adhesive the second part is secured on the first part. This fastening arrangement and the corresponding method for producing this fastening arrangement are likewise labour- and cost intensive.

SUMMARY OF THE INVENTION

It is an object of the invention to provide a method for producing a fastening arrangement for the position-correct fastening of a component to a structural part of a motor vehicle that is cost-saving and process-stable without increased expenditure.

Furthermore, it is an object of the invention to provide a fastening arrangement for the position-correct fastening of a component to a structural part of a motor vehicle.

According to an aspect, a method is provided, comprising the steps providing of a structural part; providing of a first tolerance compensation element and a second tolerance compensation element; positioning of the first tolerance compensation element, while holding the structural part firmly, relative to the structural part in a nominal position for a later position-correct fastening of a component to be fastened to the structural part, the first tolerance compensation element being positioned with a gap relative to the structural part; holding of the first tolerance compensation element in the nominal position; inserting of the second tolerance compensation element between the first tolerance compensation element and the structural part, so that the gap between the first tolerance compensation element and the structural part is bridged over; joining of the second tolerance compensation element to the first tolerance compensation element and to the structural part, so that a fastening arrangement for the position-correct fastening of the component to the structural part is obtained.

According to another aspect, a fastening arrangement is provided, comprising a structural part, a first tolerance compensation element, a second tolerance compensation element, the first tolerance compensation element being positioned relative to the structural part and with a gap from the structural part in a nominal position for a later position-correct fastening of a component to be fastened to the structural part, the second tolerance compensation element being inserted between the first tolerance compensation element and the structural part, whereby the gap between the first tolerance compensation element and the structural part is bridged over, the second tolerance compensation element being joined to the first tolerance compensation element and to the structural part so that the fastening arrangement allows position-correct fastening of the component to the structural part.

In the method according to the invention, a first tolerance compensation element and a second tolerance compensation element are used, in contrast with the method known in the prior art, which uses only one tolerance compensation element. In the method according to the invention, the first tolerance compensation element is positioned, while holding the structural part firmly, relative to the structural part in a nominal position for the later position-correct fastening of the component to be fastened and held in the nominal position relative to the structural part. The positioning and holding of the first tolerance compensation element can be done by means of a suitable positioning and holding device. The structural part can be held firmly by clamping the structural part in a corresponding suitable device. The first tolerance compensation element is positioned with a gap relative to the structural part, by which is meant that the first tolerance compensation element in the nominal position does not touch the structural part at all or only partially. The first tolerance compensation element thus takes a "floating position" in the nominal position. Next, the second tolerance compensation element is inserted between the first tolerance compensation element and the structural part, preferably by sliding, which bridges over the gap between the first tolerance compensation element and the structural part. The second tolerance compensation element has degrees of freedom relative to the first tolerance compensation element while being inserted, which compensates for the manufacturing tolerances of the structural part. Finally, the second tolerance compensation element is joined to the first tolerance compensation element and to the structural part, in order to permanently fix the nominal position of the first tolerance compensation element. In the method according to the invention, the joining does not serve to compensate for the tolerance, but only for the final fixation. In particular, the joining can occur with a process which is not sensitive to environmental influences, especially by means of welding. According to preferred embodiments, however, the first tolerance compensation element and the second tolerance compensation element as well as the structural part can also be joined together by soldering, gluing, or forming.

Thanks to the method according to the invention, there is no later machining of the structural part to compensate for the tolerances and also no creating of special environmental conditions. The method and the fastening arrangement according to the invention are thus more cost-saving and process-stable than the known methods and fastening arrangements.

In one preferred refinement of the method and the fastening arrangement, the first tolerance compensation element has a segment for the partial supporting of the component to be fastened, wherein the nominal position comprises the angle position of the segment around at least one axis and/or the distance of the segment from the structural part.

Since the first tolerance compensation element in the nominal position is positioned with a gap from the structural part, the segment of the first tolerance compensation element can be positioned with an angle or tilting position relative to the structural part needed for the tolerance compensation and/or at a distance from the structural part needed for the tolerance compensation. Advantageously, in this way an exact position-correct attachment of the component to be fastened can be achieved. The second tolerance compensation element only needs be such that it bridges over the gap between the first tolerance compensation element and the structural part in order to produce a connection between the structural part and the first tolerance compensation element. Accordingly, there are no demands placed on the relative position of the second tolerance compensation element thanks to this degree of freedom with respect to the first tolerance compensation element prior to the joining.

The aforementioned segment of the first tolerance compensation element is preferably flat on its side for the partial supporting of the component to be fastened, and the segment can be shaped as a plate.

In another preferred refinement, the first tolerance compensation element has a connection point for the fastening of the component, wherein the nominal position comprises the position of the connection point in at least two mutually perpendicular spatial directions.

In this refinement, the first tolerance compensation element furthermore serves directly for the later fastening of the component to the structural part, while the connection point on the first tolerance compensation element can have an opening or a screw fastener, such as a threaded nut. Then the component can be fastened to the first tolerance compensation element, for example by means of a screw, which is inserted through the opening in the first tolerance compensation element and locked by a nut, or by means of a screw which is screwed in the screw fastener of the first tolerance compensation element. In the sense of the exact position-correct fastening of the component to be fastened, the connection point of the first tolerance compensation element is positioned in at least two spatial directions, for example, along an x and y axis of a Cartesian coordinate system and position-correct in terms of the nominal position, so that no later adjustments are needed when fastening the component to the structural part in order to achieve the exact position-correct placement of the component.

In another preferred refinement of the method and the fastening arrangement, the first tolerance compensation element has a first raised edge, which in the nominal position points toward the structural part, and wherein the second tolerance compensation element has a second raised edge, while the second tolerance compensation element is inserted such between the first tolerance compensation element and the structural part that the second raised edge of the second tolerance compensation element faces the first raised edge and is at least partially overlapping with it, and wherein the first raised edge is joined to the second raised edge.

The configuration of the first and second tolerance compensation elements each with a raised edge, for example as plates with raised edges, has the benefit of an especially simple and economical configuration of the tolerance compensation elements. A further benefit is that the second tolerance compensation element can be inserted with very slight manipulation labour between the first tolerance compensation element and the structural part, namely, by being slid from the side by its raised edge. The mutually facing raised edges of the first and second tolerance compensation elements then ensure the bridging of the gap between the first tolerance compensation element and the structural part, since the edges of the second tolerance compensation element and the first tolerance compensation element at least partly overlap, and the edges on either side can then be joined to each other.

In an especially simple design, the first tolerance compensation element is U-shaped and the second tolerance compensation element is U-shaped, while the first raised edge has first legs and the second raised edge has second legs, the first legs and the second legs being nested in each other.

Preferably, the legs of the first tolerance compensation element have a shorter spacing from each other than the legs of the second tolerance compensation element.

In this refinement, the legs of the second tolerance compensation element lie on the outside against the legs of the first tolerance compensation element when the second tolerance compensation element is inserted. This produces the benefit, on the one hand, that the joints between the first and second tolerance compensation elements are easily accessible from the outside, especially for welding, and on the other hand the legs of the first tolerance compensation element serve as guide surfaces on the outside during insertion, especially sliding in of the second tolerance compensation element, which makes the joining process very easy.

Advantageously, the second raised edge of the second tolerance compensation element can have at least one bent tab, serving as a stop when inserting the second tolerance compensation element between the first tolerance compensation element and the structural part.

This advantageously prevents the second tolerance compensation element from being slid too far into the gap between the first tolerance compensation element and the structural part, or too little, because the at least one bent tab dictates the correct position of the second tolerance compensation element upon striking against the first tolerance compensation element.

In the event that the component to be fastened to the structural part needs to be fastened at several connection places, in another preferred refinement a corresponding number of first and second tolerance compensation elements are present. The additional first tolerance compensation elements are positioned in the same way as described above to other connection locations in corresponding additional nominal positions relative to the structural part, and the additional second tolerance compensation elements are accordingly inserted between the additional first tolerance compensation elements and the structural part in order to bridge over the gaps between the additional first tolerance compensation elements and the structural parts, and finally the additional second tolerance compensation elements are joined to the additional first tolerance compensation elements and the structural part.

The fastening arrangement according to the invention can have, for example, three first and three second tolerance compensation elements, which are secured as described above to three spaced-apart connection places of the structural parts, producing a corresponding tolerance compensation at each connection location. This tolerance compensation can be different from one connection location to another on the structural part. The positioning of the plurality of first tolerance compensation elements relative to the structural part in the respective nominal positions can preferably be done at the same time, so that the method of the invention can be carried out with little time involved. For this, the first tolerance compensation elements can be placed in a corresponding common positioning and holding device, transferred to the structural part, and appropriately positioned and held there.

Further benefits and features will emerge from the following description.

Of course, the aforementioned and following explained features can be used not only in the particular combination indicated, but also in other combinations or by themselves, without leaving the scope of the present invention.

BRIEF DESCRIPTION OF THE DRAWINGS

An exemplary embodiment is represented in the drawings and described more closely below with reference to this.

DESCRIPTION OF PREFERRED EXEMPLARY EMBODIMENTS

Figure 1:
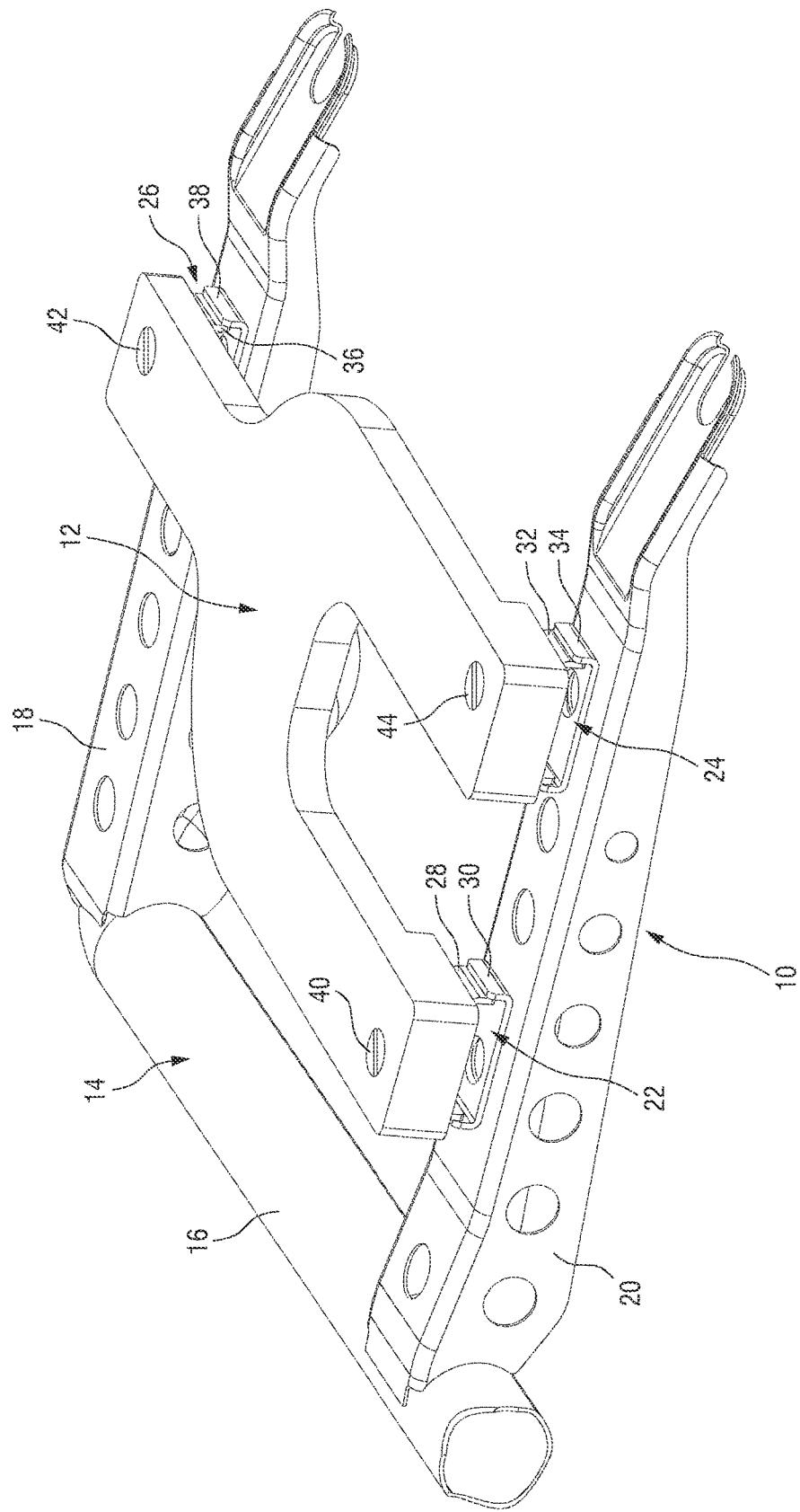
FIG. 1 shows, in perspective view, a fastening arrangement for the position-correct fastening of a component to a structural part of a motor vehicle with the component fastened to it.

FIG. 1 shows a fastening arrangement labelled with the general reference number 10 for the position-correct fastening of a component 12 to a structural part 14 of a motor vehicle, not shown.

The component 12 is only schematically indicated in FIG. 1. In particular, the component 12 can be a head-up display.

The structural part 14, which belongs to the vehicle chassis, has a cross beam 16, a portion of which is shown in the sample embodiment, and two holders 18 and 20, secured to the cross beam 16. In the installed state of the structural part 14 in a motor vehicle, the two holders 18 and 20 point forward, looking in the driving direction.

The component 12 is secured to the fastening arrangement 10 at three connection locations 22, 24, 26. The two connection locations 22 and 24 are located on the holder 20, and the connection location 26 on the holder 18.

The fastening arrangement 10 has at the connection location 22 a first tolerance compensation element 28 and a second tolerance compensation element 30. Corresponding to the other two connection locations 24 and 26 the fastening arrangement 10 has at the connection location 24 an additional first tolerance compensation element 32 and an additional second tolerance compensation element 34, and at the connection location 26 an additional first tolerance compensation element 36 and an additional second tolerance compensation element 38.

At the connection locations 22, 24 and 26 the component 12 is secured by screwing, this being represented in FIG. 1 by a respective screw 40, 42 and 44. The screws 40, 42 and 44 are screwed together with the first tolerance compensation elements 28, 32 and 36.

Figure 2:
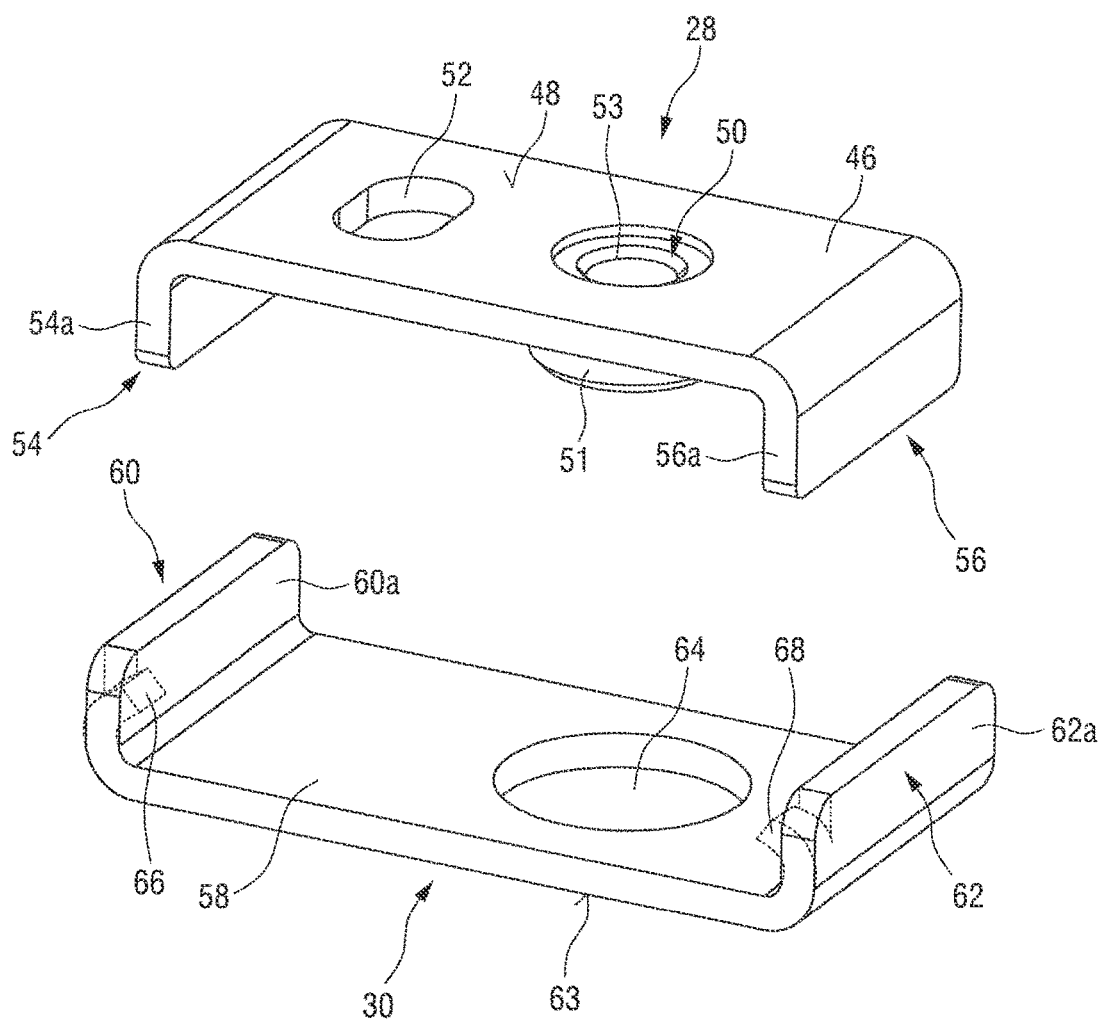
FIG. 2 shows, in perspective view, a first and a second tolerance compensation element of the fastening arrangement of FIG. 1 standing alone and separate from each other.

FIG. 2 shows the first tolerance compensation element 28 and the second tolerance compensation element 30 of the connection location 22 standing alone and enlarged compared to FIG. 1. The following description likewise holds for the additional first tolerance compensation elements 32 and 36 as well as the additional second tolerance compensation elements 34 and 38 of the connection locations 24 and 26, since these are or at least can be configured identical to the tolerance compensation elements 28 and 30.

According to FIG. 2, the first tolerance compensation element 28 has a segment 46 which is plate-like in the exemplary embodiment shown, and whose top surface 48 is flat. The surface 48 serves as a support surface for the partial supporting of the component 12 at the connection location 22, as is shown by FIG. 1. The segment 46 has a connection point 50, which is configured as a screw means, especially a threaded nut 51 with internal thread 53. When fastening the component 12, the screw 40 is screwed into the internal thread 53 of the threaded nut 51.

Instead of the screwing means, the segment 46 at the connection point 50 can also only have an opening, so that the screw 40 or a bolt is inserted through this opening and screwed at the opposite side by means of a separate threaded nut.

The segment 46 furthermore has a centering borehole 52, into which a centering pin (not shown) of the component 12 can engage.

The first tolerance compensation element 28 moreover generally has a first raised edge 54 and 56. In the sample embodiment shown, this is realized in that the first tolerance compensation element generally has the shape of a U with two first legs 54a and 56a. The legs 54a and 56a extend perpendicularly away from the segment 46.

The second tolerance compensation element 30 has a second raised edge 60 and 62, this being realized by a generally U-shaped configuration with a likewise plate-like segment 58 and two second legs 60a and 62a. The legs 60a and 62a extend perpendicularly away from the plate-like segment 58. An underside surface 63 of the segment 58 comes to lie against the holder 20 as per FIG. 1.

The segment 58 has an opening 64, through which the shaft of the screw 40 can reach, if necessary, as long as the shaft of the screw 40 has a corresponding length. The opening 64, however, has no internal thread.

The spacing between the first two legs 54a and 56a of the first tolerance compensation element 28 is less than the spacing between the second legs 60a and 62a of the second tolerance compensation element 30. The outside spacing of the first two legs 54a and 56a of the tolerance compensation element 28 roughly corresponds to or is somewhat smaller than the inner spacing of the second two legs 60a and 62a of the tolerance compensation element 30, so that the first legs 54a and 56a of the first tolerance compensation element 28 fit between the second legs 60a and 62a of the second tolerance compensation element 30, as is shown in FIG. 1. However, a converse dimensioning of the spacing of the legs 54a and 56a on the one hand and the legs 60a and 62a on the other hand is likewise conceivable. Furthermore, the legs 54a and 56a could have the same spacing on the outside as the legs 60a and 62a, so that the tolerance compensation element 28 and the tolerance compensation element 30 can be nested in each other with a staggering, with the legs 54a and 60a on the one hand and the legs 56a and 62a on the other hand overlapping each other.

In FIG. 2, the broken lines show that the leg 60a of the second tolerance compensation element 30 can have an inwardly bent tab 66 and/or the second leg 62a of the tolerance compensation element 30 can have an inwardly bent tab 68, which serve as a stop against the legs 54a and/or 56a when inserting the second tolerance compensation element 30.

Of course, other configurations are also possible for the tolerance compensation elements 28 and 30 than the ones shown. Thus, the tolerance compensation element 28 and/or 30 can be L-shaped, T-shaped, with non-rectangular segments 46 and/or 58, with curved raised edges 54, 56, 60, 62, such as in the shape of bottle caps, while the raised edges 54, 56 or 60, 62 can be continuous or, as shown, interrupted.

With regard to FIGS. 3 to 5, a method shall now be described for producing the fastening arrangement 10.

Figure 3:
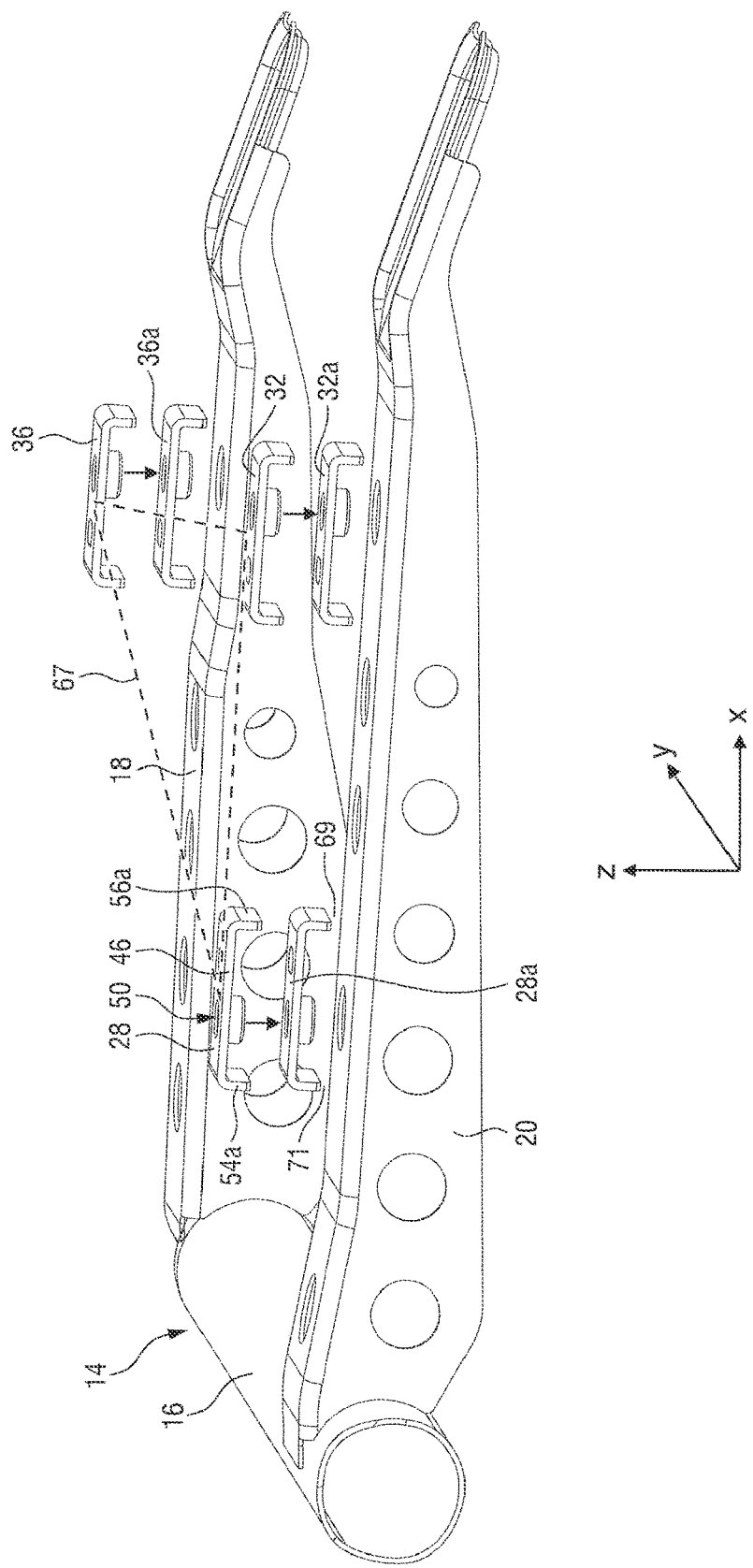
FIG. 3 shows, in perspective view, a first stage of a method for producing the fastening arrangement in FIG. 1.

FIG. 3 shows the first steps of the method.

First of all, the structural part 14 is placed in and secured in a holding device, not shown.

The first structural parts 28, 32 and 36 are placed together in a positioning and holding device and brought up to the structural part 14. The positioning and holding device is indicated in FIG. 3 by a broken line 67. The assemblage of the first three tolerance compensation elements 28, 32 and 36 is then positioned relative to the structural part 14 while the structural part 14 continues to be held firmly. In this process, each of the tolerance compensation elements 28, 32 and 36 is positioned in a respective nominal position corresponding to the connection locations 22, 24 and 26 in FIG. 1 for the later position-correct fastening of the component 12 and held in this respective nominal position relative to the structural part 14. The nominal positions of the first tolerance compensation elements 28, 32 and 36 are indicated in FIG. 3 by 28a, 32a and 36a. The nominal positions 28a, 32a and 36a in other words correspond precisely to the position of the tolerance compensation elements 28, 32 and 36, as are shown in FIG. 1 after producing the fastening arrangement 10.

The first tolerance compensation elements 28, 32, 36 in the nominal positions 28a, 32a and 36a are positioned with a gap relative to the structural part 14, or more precisely, to the holders 18 and 20, as is shown in FIG. 3 by reference numbers 69, 71 for the first tolerance compensation element 28 in the nominal position 28a. The tolerance compensation elements 28, 32 and 36 can each be arranged or spaced at a gap from the holders 18 and 20 as a whole or only partly. As is further shown in FIG. 3, the legs 54a and 56a of the first tolerance compensation element 28 point toward the holders 18 and 20 (the same holds for the tolerance compensation elements 32 and 36).

The respective nominal positions of the first tolerance compensation elements 28, 32 and 36 indicated by the reference numbers 28a, 32a and 36a are determined both by the angle position of the respective segment 46 around the x axis (see coordinate system in FIG. 3) and/or the y axis and/or the distance of the segment 46 from the structural part 14, here, more precisely, the distance from the respective top side of the holder 18 and 20 in the direction of the z axis. Furthermore, the respective nominal position of the respective first tolerance compensation element 28, 32 and 36 is determined by the position of the connection point 50 in at least two mutually perpendicular spatial directions, here, the x and y axis.

Figure 4:
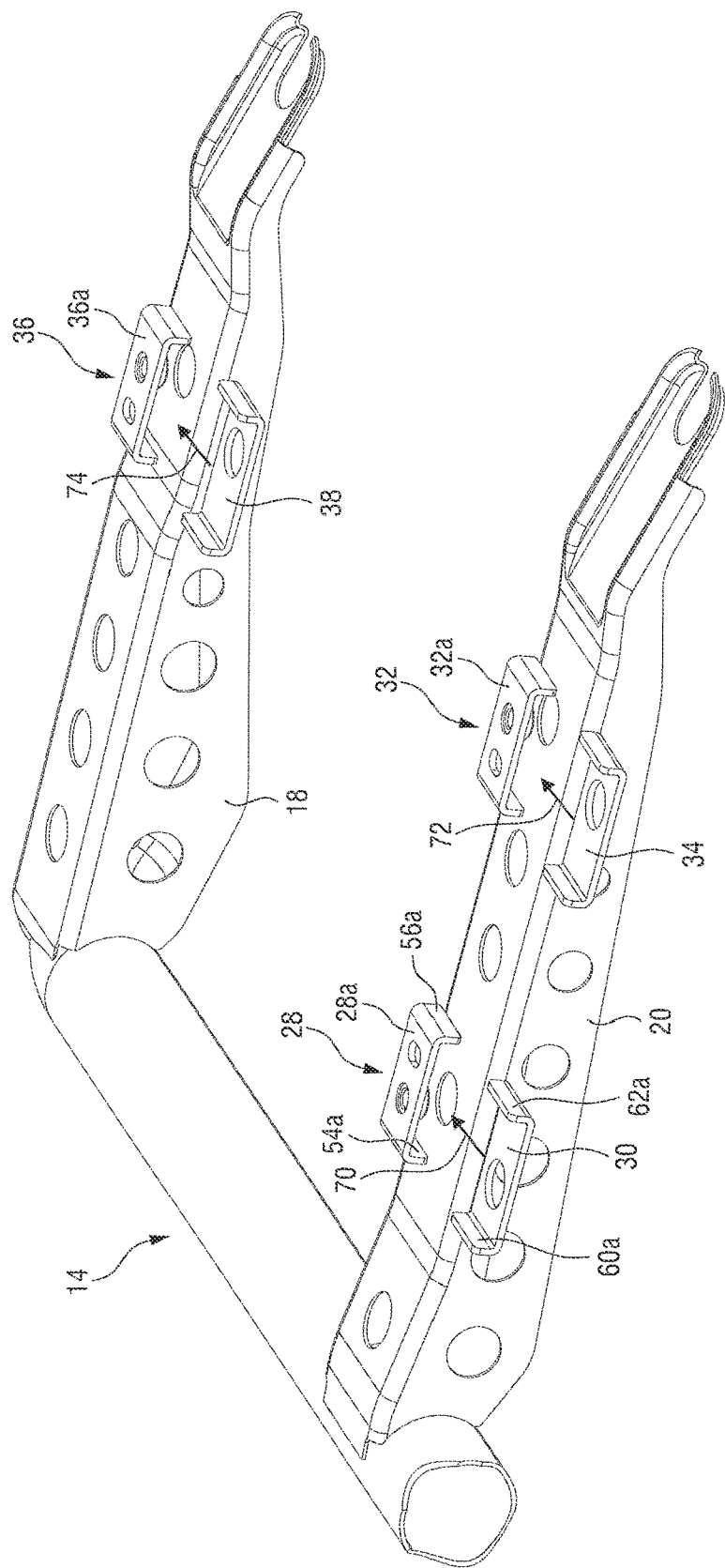
FIG. 4 shows, in perspective view, a further stage of the method for producing the fastening arrangement in FIG. 1.

According to a further step of the method, which is shown in FIG. 4, the first tolerance compensation elements 28, 32 and 36 continue to be held firmly in the predetermined nominal positions 28a, 32a and 36a. Now, the second tolerance compensation element 30 is inserted between the first tolerance compensation element 28 and the structural part 14, here, the holder 20, the second tolerance compensation element 34 is inserted between the first tolerance compensation element 32 and the structural part 14, here the holder 20, and the second tolerance compensation element 38 is inserted between the first tolerance compensation element 36 and the structural part 14, here the holder 18. The respective inserting is done by sliding in, as illustrated by arrows 70, 72 and 74. The second tolerance compensation elements 30, 34 and 38 thereby bridge over the respective gap 69, 71 between the first tolerance compensation elements 28, 32 and 36 and the structural part 14. When sliding in the second tolerance compensation elements 30, 34, 38 the legs 54a and 56a of the first tolerance compensation elements 28, 32, 36 serve as guides for the legs 60a and 62a of the second tolerance compensation elements 30, 34, 38.

As emerges from FIG. 4, the second tolerance compensation elements 30, 34 and 38 are inserted so that their second legs 60a and 62a are facing the first legs 54 and 56 of the first tolerance compensation elements 28, 32 and 36.

Figure 5:
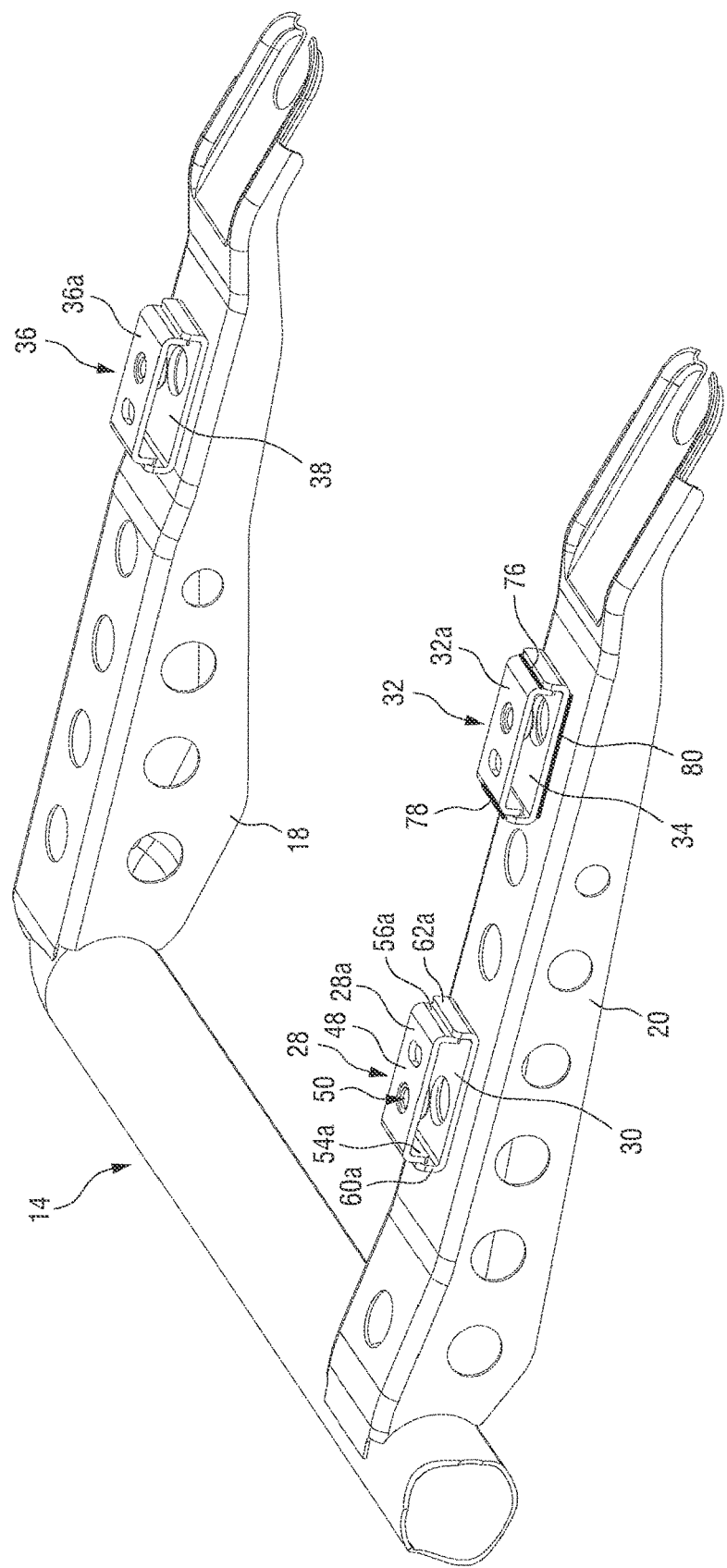
FIG. 5 shows, a concluding stage of the method for producing the fastening arrangement in FIG. 1.

FIG. 5 shows the condition of the second tolerance compensation elements 30, 34 and 38 slid in between the first tolerance compensation elements 28a, 32a and 36a and the structural part 14. As also emerges from FIG. 5, the facing legs 54a and 56a of the first tolerance compensation elements 28, 32, 36 and the legs 60a and 62a of the second tolerance compensation elements 30, 34 and 38 are nested in each other and have an overlap, which can be different according to the manufacturing tolerance of the structural part 14 to be compensated. Depending on the manufacturing tolerance to be compensated, the legs 60a and 62a of the second tolerance compensation elements 30, 34 and 38 can also run obliquely to the legs 54a and 56a of the first tolerance compensation elements 28, 32 and 36. This is possible because the second tolerance compensation elements 30, 34 and 38 have degrees of freedom relative to the first tolerance compensation elements 28, 32 and 36 in the inserting or sliding process.

During the inserting or sliding in of the second tolerance compensation elements 30, 34 and 38, the optionally present bent tabs 66 and 68 as per FIG. 2 can serve as a stop or sliding limit, since the bent tabs 66 and 68 (not shown in FIG. 5) strike against the end faces of the legs 54a and 56a of the first tolerance compensation elements 28, 32 and 35 when being slid in.

After inserting the second tolerance compensation elements 30, 34 and 38, the first tolerance compensation elements 28, 32 and 36 continue to be held firmly in the aforementioned holding and positioning device. Now, the nominal positions 28a, 32a and 36a of the first tolerance compensation elements 28, 32 and 36 are permanently secured in that the second tolerance compensation elements 30, 34 and 38 are joined to the tolerance compensation elements 28, 32 and 36 and to the structural part 14, here the holders 18, 20. The joining of the tolerance compensation elements 28 and 30, 32 and 34, 36 and 38 to each other occurs at the raised edges 54, 60 and 56, 62. The joining can be done by means of welding, soldering, gluing or forming.

In particular, MAG welding can be used as the joining process. FIG. 5 illustrates corresponding weld seams 76, 78 and 80 for the first tolerance compensation element 32 and the second tolerance compensation element 34.

After the joining, the entire fastening arrangement of structural part 14 and the tolerance compensation elements 28, 32, 36 as well as 30, 34 and 38 can now be removed from the respective holding device. Regardless of any manufacturing tolerances of the structural part 14, particularly the holders 18 and 20, the connection points 50 of the first tolerance compensation elements 28, 32 and 36 now have the correct spatial position for the position-correct fastening of the component 12 as per FIG. 1.

In so far as the tolerance compensation elements 28, 32 and 36 and the tolerance compensation elements 30, 34 and 38 are made of metal and a galvanic separation is required between the component 12 and the structural part 14, a galvanic separation can be realized in the region of the connection points 50 and on the top surfaces 48 of the tolerance compensation elements 28, 32 and 36, for example, by using or depositing plastic elements or plastic surfaces there.

In so far as the joining of the tolerance compensation elements 30, 34 and 38 with the tolerance compensation elements 28, 32 and 36 and the structural part 14 is done by welding, it is possible to account for any anticipated welding warpage when determining the respective nominal position of the first tolerance compensation elements 28, 32 and 36.

What is claimed is:

1. A method, comprising the steps:
providing of a structural part of a vehicle;
providing of a first tolerance compensation element and a second tolerance compensation element;
positioning of the first tolerance compensation element, while holding the structural part firmly, relative to the structural part in a nominal position for a later position-correct fastening of a component to be fastened to the structural part, the first tolerance compensation element being positioned in the nominal position with a gap disposed between the first tolerance compensation element and the structural part;
holding of the first tolerance compensation element in the nominal position maintaining the gap between the first tolerance compensation element and the structural part;
inserting of the second tolerance compensation element into the gap disposed between the first tolerance compensation element and the structural part while the first tolerance compensation element is held in the nominal position by sliding the second tolerance compensation element relative to the structural part and the first tolerance compensation element, so that the gap between the first tolerance compensation element and the structural part is bridged over by the second tolerance compensation element; and
joining of the second tolerance compensation element to the first tolerance compensation element and to the structural part while the first tolerance compensation element is held in the nominal position, so that a fastening arrangement for the position-correct fastening of the component to the structural part is obtained.

2. The method of claim 1, wherein the first tolerance compensation element has a segment for partially supporting of the component to be fastened, wherein the nominal position comprises at least one of an angle position of the segment around at least one axis and a distance of the segment from the structural part.

3. The method of claim 1, wherein the first tolerance compensation element has a connection point for the fastening of the component, wherein the nominal position comprises a position of the connection point in at least two mutually perpendicular spatial directions.

4. The method of claim 1, wherein the first tolerance compensation element has a first raised edge, wherein the raised edge of the first tolerance compensation element in the nominal position points toward the structural part, and wherein the second tolerance compensation element has a second raised edge, wherein the step of inserting comprises inserting the second tolerance compensation element such between the first tolerance compensation element and the structural part that the second raised edge of the second tolerance compensation element faces the first raised edge and is at least partially overlapping with the first raised edge, and the step of joining comprises joining the first raised edge to the second raised edge.

5. The method of claim 4, wherein the first tolerance compensation element is U-shaped and the second tolerance compensation element is U-shaped, wherein the first raised edge has first legs and the second raised edge has second legs, the step of inserting comprising nesting the first legs and the second legs in each other.

6. The method of claim 5, wherein the first legs have a shorter spacing from each other than the second legs.

7. The method of claim 4, wherein the second raised edge has at least one bent tab, serving as a stop when inserting the second tolerance compensation element between the first tolerance compensation element and the structural part.

8. The method of claim 1, wherein the step of joining comprises at least one of welding, soldering, gluing, forming.

9. The method of claim 1, further comprising providing at least one additional first tolerance compensation element and at least one additional second tolerance compensation element, positioning the additional first tolerance compensation element, while holding the structural part firmly, relative to the structural part and with a gap from the structural part in an additional nominal position for the later position-correct fastening of the component to be fastened and holding the additional first tolerance element in the additional nominal position, inserting the additional second tolerance compensation element between the first tolerance compensation element and the structural part, thus bridging over the gap between the additional first tolerance compensation element and the structural part, and joining the additional second tolerance compensation element to the additional first tolerance compensation element and to the structural part.

10. The method of claim 9, further comprising positioning the first tolerance compensation element and the at least one additional first tolerance compensation element relative to the structural part at the same time.

* * * * *